US009337926B2

(12) United States Patent
Bose et al.

(10) Patent No.: US 9,337,926 B2
(45) Date of Patent: May 10, 2016

(54) APPARATUS AND METHOD FOR PROVIDING DYNAMIC FIDUCIAL MARKERS FOR DEVICES

(75) Inventors: Raja Bose, Mountain View, CA (US); Jonathan Lester, San Francisco, CA (US); Jörg Brakensiek, Mountain View, CA (US)

(73) Assignee: Nokia Technologies Oy, Espoo (FI)

( * ) Notice: Subject to any disclaimer, the term of this patent is extended or adjusted under 35 U.S.C. 154(b) by 360 days.

(21) Appl. No.: 13/285,836

(22) Filed: Oct. 31, 2011

(65) Prior Publication Data

US 2013/0109961 A1    May 2, 2013

(51) Int. Cl.
*H04B 10/116* (2013.01)

(52) U.S. Cl.
CPC .................................. *H04B 10/116* (2013.01)

(58) Field of Classification Search
None
See application file for complete search history.

(56) References Cited

U.S. PATENT DOCUMENTS

| | | | | |
|---|---|---|---|---|
| 5,841,978 | A * | 11/1998 | Rhoads | 709/217 |
| 6,286,036 | B1 * | 9/2001 | Rhoads | 709/217 |
| 6,311,214 | B1 * | 10/2001 | Rhoads | 709/217 |
| 6,625,299 | B1 * | 9/2003 | Meisner et al. | 382/103 |
| 7,162,054 | B2 * | 1/2007 | Meisner et al. | 382/103 |
| 7,760,905 | B2 * | 7/2010 | Rhoads et al. | 382/100 |
| 7,805,500 | B2 * | 9/2010 | Rhoads | 709/219 |
| 7,953,824 | B2 * | 5/2011 | Rhoads et al. | 709/219 |
| 8,078,697 | B2 * | 12/2011 | Rhoads | 709/219 |
| 2001/0032251 | A1 * | 10/2001 | Rhoads et al. | 709/217 |
| 2003/0050961 | A1 * | 3/2003 | Rodriguez et al. | 709/203 |
| 2003/0053714 | A1 * | 3/2003 | Esaki et al. | 382/287 |
| 2004/0131232 | A1 * | 7/2004 | Meisner et al. | 382/103 |
| 2005/0139680 | A1 * | 6/2005 | Anttila | G06K 1/18 235/462.46 |
| 2006/0192925 | A1 * | 8/2006 | Chang | 353/94 |
| 2006/0208088 | A1 | 9/2006 | Sekiguchi | |
| 2007/0017996 | A1 | 1/2007 | Xia et al. | |

(Continued)

FOREIGN PATENT DOCUMENTS

| | | |
|---|---|---|
| EP | 1 621 985 A2 | 2/2006 |
| WO | WO 2010/094065 A1 | 8/2010 |

OTHER PUBLICATIONS

Bencina et al, "Improved Topological Fiducial Tracking in the reacTIVision System", Proceedings of the 2005 IEEE Computer Society Conference on Computer Vision and Pattern Recognition (CVPR'05).*
M. Rohs and B. Gfeller, Using camera-equipped mobile phones for interacting with real-world objects, Proceedings of Advances in Pervasive Computing, pp. 265-271, Apr. 2004.*
Jonathan M. McCune et al., Seeing-Is-Believing: Using Camera Phones for Human-Verifiable Authentication, Proceedings of the 2005 IEEE Symposium on Security and Privacy (S&P'05).*
Steurer, Philipp, et al.; "System Design of Smart Table"; Networked and Embedded Systems Laboratory Electrical Engineering Department, UCLA; pp. 1-8; Last Accessed Sep. 9, 2011.

(Continued)

*Primary Examiner* — Long V Le
*Assistant Examiner* — Bradley Impink
(74) *Attorney, Agent, or Firm* — Alston & Bird LLP

(57) ABSTRACT

An apparatus, method, and computer program product are described below that can provide and/or detect dynamic fiducial markers presented on a display of an apparatus. An apparatus providing the fiducial marker may initially provide for the presentation of the fiducial marker on a display, where the fiducial marker represents one or more properties of the apparatus, such as connectivity information for the apparatus. The apparatus may modify the presentation of the fiducial marker based on a change in one or more properties of the apparatus. An apparatus configured to detect dynamic fiducial markers provided on other device displays may also be configured to provide for the presentation of its own fiducial markers, and vice versa. Thus, in some cases, apparatuses may function as both a tangible user interface display and a tangible object (e.g., in a bi-directional communication scenario).

10 Claims, 10 Drawing Sheets

(56) References Cited

U.S. PATENT DOCUMENTS

| | | |
|---|---|---|
| 2007/0276928 A1* | 11/2007 | Rhoads et al. ............... 709/219 |
| 2008/0183071 A1* | 7/2008 | Strommer et al. ............ 600/424 |
| 2008/0266323 A1* | 10/2008 | Biocca et al. ................ 345/633 |
| 2009/0109894 A1* | 4/2009 | Ueda ..................... H04B 1/385 370/315 |
| 2009/0287837 A1* | 11/2009 | Felsher ......................... 709/229 |
| 2009/0307592 A1 | 12/2009 | Kalanithi et al. |
| 2010/0082784 A1* | 4/2010 | Rosenblatt et al. ........... 709/222 |
| 2011/0066734 A1* | 3/2011 | Rhoads ......................... 709/227 |
| 2011/0187731 A1 | 8/2011 | Tsuchida |
| 2012/0116858 A1* | 5/2012 | Simmons, Jr. ............. 705/14.19 |
| 2013/0031261 A1* | 1/2013 | Suggs ............................ 709/228 |
| 2013/0062402 A1* | 3/2013 | Cok et al. ...................... 235/375 |
| 2013/0230178 A1* | 9/2013 | Gates et al. ..................... 381/56 |
| 2014/0164580 A1* | 6/2014 | Cheloff ........................ 709/220 |
| 2014/0226819 A1* | 8/2014 | Dittrich ........................ 380/270 |
| 2014/0279541 A1* | 9/2014 | Castrechini et al. ............. 705/44 |

OTHER PUBLICATIONS

Bencina, Ross, et al.; "Improved Topological Fiducial Tracking in the reacTIVision System"; Music Technology Group, Audiovisual Institute; Universitat Pompeu Fabra, Barcelona, Spain, pp. 1-8; Last Accessed Sep. 9, 2011.

White, Sean, et al.; "Visual Hints for Tangible Gestures"; Columbia University, pp. 1-4; Last Accessed Sep. 9, 2011.

Transcript of YouTube Video (http://www.youtube.com/watch?v=Zxk_WywMTzc#t=4m38s); 9 minutes, 58 seconds total duration; Transcript portion from 4 minutes, 38 seconds to 5 minutes, 19 seconds; Last Accessed Dec. 7, 2011.

Transcript of YouTube Video (http://www.youtube.com/watch?v=5oFgNRI4XOA); 15 seconds total duration; Entire transcript provided; Last Accessed Dec. 7, 2011.

International Search Report and Written Opinion for Application No. PCT/FI2012/051046 dated Mar. 25, 2013.

* cited by examiner

APPARATUS AND METHOD FOR PROVIDING DYNAMIC FIDUCIAL MARKERS FOR DEVICES

TECHNOLOGICAL FIELD

Embodiments of the present invention relate generally to providing fiducial markers on displays of devices. In particular, embodiments of the present invention relate to an apparatus and method for presenting a fiducial marker on the display of a device and modifying the presentation of the fiducial marker in response to a change in the device, such as a changed IP address of the device or preferred mode of communication.

BACKGROUND

In the modern age of technology, more and more devices are able to communicate with each other, such as to exchange information. Devices such as digital cameras, cellular phones, laptop computers, and other personal mobile devices, in many cases, can wirelessly interact with other devices to provide enhanced user functionality and an improved user experience.

In establishing channels of communications between devices, each device may need to provide certain information to the other device to facilitate the communication. For example, information such as the device's Internet Protocol (IP) address or preferred mode of communication may be conveyed. Such information is often not static and may change during the course of the communication, resulting in a disruption or delay of the communication.

Accordingly, it may be desirable to provide an improved mechanism for establishing and maintaining a communications connection with a device by allowing for information relating to the communications connection to be dynamically provided and received between devices.

BRIEF SUMMARY OF EXAMPLE EMBODIMENTS

Accordingly, embodiments of an apparatus, method, and computer program product are described that can provide and/or receive dynamic fiducial markers on a display, where the fiducial markers represent a characteristic or property of the apparatus and can be modified as necessary to reflect changes in the apparatus to facilitate communications. In particular, embodiments of an apparatus for receiving dynamic fiducial markers (e.g., apparatuses embodied by a tangible user interface display) may include at least one processor and at least one memory including computer program code. The at least one memory and the computer program code may be configured to, with the processor, cause the apparatus to at least receive an indication of a first fiducial marker presented on a display of a device proximate the apparatus; execute a first operation based on the first fiducial marker; receive an indication of a second fiducial marker presented on the display of the device; and execute a second operation based on the second fiducial marker. In this regard, the second fiducial marker may be different from the first fiducial marker and may replace the first fiducial marker.

In some cases, the memory and computer program code may be configured to, with the processor, cause the apparatus to provide for presentation of a fiducial marker on the display of the apparatus, where the fiducial marker is representative of at least one property of the apparatus and is detectable by the device. The presentation of the fiducial marker on the display of the apparatus may be provided in response to the receipt of the indication of the first fiducial marker or the indication of the second fiducial marker presented on the display of the device. Moreover, the memory and computer program code may be configured to, with the processor, cause the apparatus to decode the indication of at least one of the first fiducial marker or the second fiducial marker.

In other embodiments, an apparatus for providing dynamic fiducial markers may include at least one processor and at least one memory including computer program code. The at least one memory and the computer program code may be configured to, with the processor, cause the apparatus to at least provide for presentation of a fiducial marker on a display of the apparatus, where the fiducial marker is representative of at least one property of the apparatus, and modify the presentation of the fiducial marker. The presentation of the fiducial marker may be modified in response to a change in the at least one property of the apparatus. For example, the at least one property of the apparatus may comprise at least one of a position, an orientation, an identity, or connectivity information of the apparatus.

In some embodiments, the memory and computer program code may be configured to, with the processor, cause the apparatus to receive an indication of a fiducial marker presented on a display of a device proximate the apparatus. The memory and computer program code may be configured to, with the processor, cause the apparatus to modify the presentation of the fiducial marker based on the indication received. The fiducial marker may include steganographic information. Furthermore, the display of the apparatus may be a polarized display, such that the presentation of the fiducial marker on the display is dependent on an angle of the display of the apparatus with respect to a display of a device proximate the apparatus.

In other embodiments, a method and a computer program product are provided for receiving dynamic fiducial markers by receiving an indication of a first fiducial marker presented on a display of a device, executing a first operation based on the first fiducial marker, receiving an indication of a second fiducial marker presented on the display of the device, and executing a second operation based on the second fiducial marker. The second fiducial marker may be different from the first fiducial marker and may replace the first fiducial marker. Presentation of a fiducial marker on a display of an apparatus may be provided for in some cases, where the fiducial marker is representative of at least one property of the apparatus and is detectable by the device. In still other cases, the indication of at least one of the first fiducial marker or the second fiducial marker may be decoded.

In still other embodiments, a method and a computer program product are described for providing dynamic fiducial markers by providing for presentation of a fiducial marker on a display of an apparatus, where the fiducial marker is representative of at least one property of the apparatus, and modifying the presentation of the fiducial marker. The presentation of the fiducial marker may be modified in response to a change in the at least one property of the apparatus.

In some cases, an indication of a fiducial marker presented on a display of a device proximate the apparatus may be received. Furthermore, the fiducial marker may include steganographic information. In addition, the display of the apparatus may be a polarized display, such that the presentation of the fiducial marker on the display is dependent on an angle of the display of the apparatus with respect to a display of a device proximate the apparatus.

In still other embodiments, an apparatus is provided for receiving dynamic fiducial markers that includes means for receiving an indication of a first fiducial marker presented on a display of a device, means for executing a first operation based on the first fiducial marker, means for receiving an indication of a second fiducial marker presented on the display of the device, and means for executing a second operation based on the second fiducial marker. The second fiducial marker may be different from the first fiducial marker and may replace the first fiducial marker.

In still other embodiments, an apparatus is provided for providing dynamic fiducial markers that includes means for providing for presentation of a fiducial marker on a display of an apparatus, where the fiducial marker is representative of at least one property of the apparatus, and means for modifying the presentation of the fiducial marker. The presentation of the fiducial marker may be modified in response to a change in the at least one property of the apparatus.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
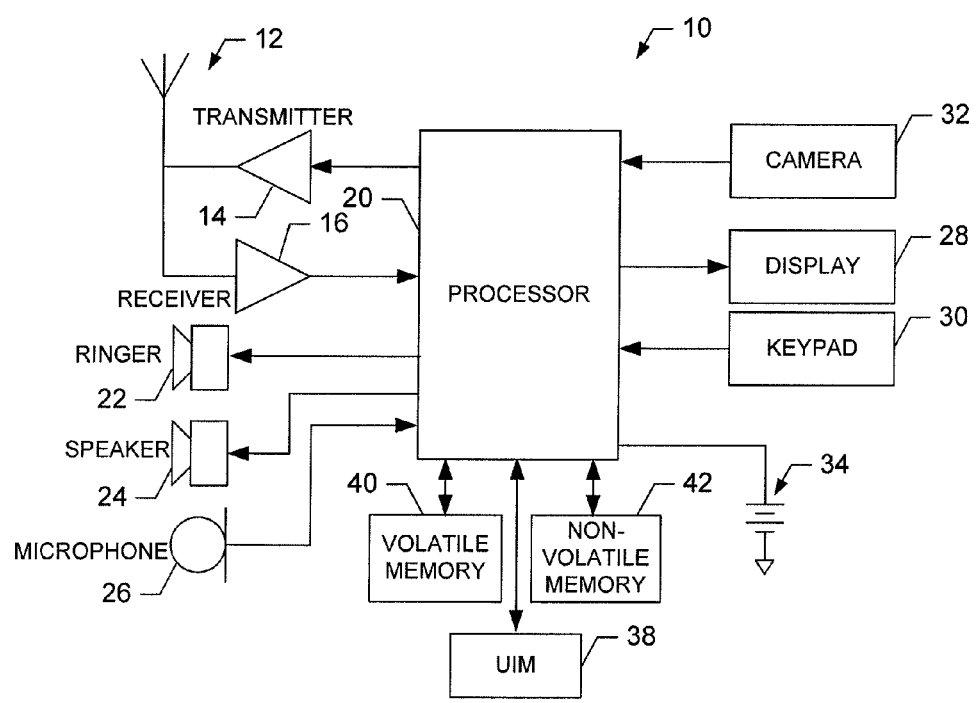
FIG. 1 illustrates one example of a communication system according to an example embodiment of the present invention.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), can be differentiated from a "computer-readable transmission medium," which refers to an electromagnetic signal.

A tangible user interface is a form of user interface in which a user interacts with digital information using the physical environment. A touch display (e.g., a "tangible user interface display"), which may vary in size from a table top display to a notebook-sized display to a cellular telephone display, for example, may be configured to allow a user to interact with data related to an object (e.g., a "tangible object") placed on or near the tangible user interface display. In other words, the display may be able to "see" what the tangible object is, access data about the tangible object (e.g., through a connection with a network such as the Internet, through a wireless connection with the tangible object itself, from a memory associated with the display, or from some other remote storage location), present the data via the tangible user interface display, and/or allow the user to view, modify, manipulate, and otherwise interact with the data via the tangible user interface display.

Such displays may use "computer vision" to detect and identify a tangible object with which to interact. For example, cameras may be provided on a housing of the display or integral to the display itself, and the cameras may be configured to detect reflections of infrared (IR) light from objects that contact or come in close proximity to the display. Thus, placement of a fiducial marker or optical tag on any object, from a wine glass to the housing of a cellular telephone, may allow the tangible user interface display to recognize the object as a tangible object via the reflection of IR light off the fiducial marker. The fiducial marker may include different aspects of information regarding the tangible object, including what the object is, its position, its orientation with respect to the tangible user interface display, how to establish a communications connection with the object, and how to communicate with the object.

Taking the example of a cellular telephone, the cellular telephone may be configured with a fiducial marker on its housing that includes information identifying the device as a cellular telephone and indicating a Bluetooth address or other wireless communication protocol that the apparatus embodying the tangible user interface display (which, in some cases, may be another cellular telephone) may use to communicate with the cellular telephone. Thus, when the cellular telephone is placed near or on the tangible user interface display and the fiducial marker is read, the application embodying the tangible user interface display may present options to a user for interaction with the display and/or the cellular telephone or may execute certain operations based on the information in the fiducial marker. For example, the tangible user interface display may allow the user to access and view via the tangible user interface display pictures stored on the cellular phone. The user may be able to enlarge, rotate, or crop selected photos by providing appropriate touch gestures to the display. As another example, the tangible user interface display may generate and project a virtual image onto the fiducial marker of the cellular telephone (such as when the cellular telephone is used in virtual reality gaming applications).

Fiducial markers are conventionally printed onto the tangible object or a label that is affixed to the tangible object (such as to the underside of the cellular telephone housing). Certain information that may be represented by the fiducial marker, such as connectivity information (e.g., IP address) may not be static. In other words, the IP address associated with the cellular telephone at the time the fiducial marker is printed and affixed to the cellular telephone may change with time. This may be addressed using a third-party look-up service that maps the fiducial marker encodings to the current IP address of the phone and provides this information to the tangible user interface display; however, such a process is complicated and includes multiple potential points of failure.

Accordingly, embodiments of the apparatus, method, and computer program product described below are directed to the provision and/or detection of dynamic fiducial markers that are presented on a display of an apparatus embodied by a tangible object, as opposed to static fiducial markers that are printed on a label or other medium affixed to the tangible object. Embodiments of the apparatus, method, and computer program product described below may be in the form of a device embodying a tangible user interface (e.g., the apparatus detecting, interpreting, and executing operations based on the fiducial marker) or a device embodying a tangible object (e.g., the apparatus generating the dynamic fiducial marker). In some cases, the apparatus may function as both a tangible user interface and a tangible object, such as in cases in which the apparatus is capable of both reading a fiducial marker associated with another device and providing a fiducial marker for the other device to read (e.g., in a bi-directional communication scenario).

FIG. 1, which provides one example embodiment, illustrates a block diagram of a mobile terminal 10 that would benefit from embodiments of the present invention. It should be understood, however, that the mobile terminal 10 as illustrated and hereinafter described is merely illustrative of one type of device that may benefit from embodiments of the present invention and, therefore, should not be taken to limit the scope of embodiments of the present invention. As such, although numerous types of mobile terminals, such as portable digital assistants (PDAs), mobile telephones, pagers, mobile televisions, gaming devices, laptop computers, cameras, tablet computers, touch surfaces, wearable devices, video recorders, audio/video players, radios, electronic books, positioning devices (e.g., global positioning system (GPS) devices), or any combination of the aforementioned, and other types of voice and text communications systems, may readily employ embodiments of the present invention, other devices including fixed (non-mobile) electronic devices may also employ some example embodiments.

The mobile terminal 10 may include an antenna 12 (or multiple antennas) in operable communication with a transmitter 14 and a receiver 16. The mobile terminal 10 may further include an apparatus, such as a processor 20 or other processing device (e.g., processor 70 of FIG. 2), which controls the provision of signals to and the receipt of signals from the transmitter 14 and receiver 16, respectively. The signals may include a proximity component and/or an orientation component, as described below. The signals may further include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as evolved UMTS Terrestrial Radio Access Network (E-UTRAN), with fourth-generation (4G) wireless communication protocols (e.g., Long Term Evolution (LTE) or LTE-Advanced (LTE-A) or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks.

In some embodiments, the processor 20 may include circuitry desirable for implementing audio and logic functions of the mobile terminal 10. For example, the processor 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The processor 20 thus may also include the functionality to convolutionally encode and interleave message and data prior to modulation and transmission. The processor 20 may additionally include an internal voice coder, and may include an internal data modem. Further, the processor 20 may include functionality to operate one or more software programs, which may be stored in memory. For example, the processor 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the processor 20. The user input interface, which allows the mobile terminal 10 to receive data, may include any of a number of devices allowing the mobile terminal 10 to receive data, such as a keypad 30, a touch screen display (display 28 providing an example of such a touch screen display) or other input device. In embodiments including the keypad 30, the keypad 30 may include the conventional numeric (0-9) and related keys (#, *), and other hard and soft keys used for operating the mobile terminal 10. Alternatively or additionally, the keypad 30 may include a conventional QWERTY keypad arrangement. The keypad 30 may also include various soft keys with associated functions. In addition, or alternatively, the mobile terminal 10 may include an interface device such as a joystick or other user input interface. Some embodiments employing a touch screen display, as described further below, may omit the keypad 30 and any or all of the speaker 24, ringer 22, and microphone 26 entirely. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The memories may store any of a number of pieces of information, and data, used by the mobile terminal 10 to implement the functions of the mobile terminal 10.

In some embodiments, the mobile terminal 10 may also include a camera or other media capturing element 32 in order to capture images or video of objects, people, and places proximate to the user of the mobile terminal 10. For example, the mobile terminal 10 may include one or more cameras 32 on or embedded within the display 28 of the mobile terminal that is configured to "see" a fiducial marker provided on another device and to relay the indications derived from the image of the fiducial marker to the processor for effecting execution of one or more operations, as described in greater detail below. The mobile terminal 10 (or even some other fixed terminal) may also practice example embodiments in connection with images or video content (among other types of content) that are produced or generated elsewhere, but are available for consumption at the mobile terminal 10 (or fixed terminal).

An example embodiment of the invention will now be described with reference to FIG. 2, in which certain elements of an apparatus 50 for providing and/or detecting dynamic fiducial markers are depicted. The apparatus 50 of FIG. 2 may be employed, for example, in conjunction with the mobile terminal 10 of FIG. 1. However, it should be noted that the apparatus 50 of FIG. 2 may also be employed in connection with a variety of other devices, both mobile and fixed, and therefore, embodiments of the present invention should not be limited to application on devices such as the mobile terminal 10 of FIG. 1. For example, the apparatus 50 may be employed on a personal computer, a tablet, a mobile touch screen display, or other user terminal. Moreover, in some cases, the apparatus 50 may be on a fixed device such as server or other service platform and the content may be presented (e.g., via a server/client relationship) on a remote device such as a user terminal (e.g., the mobile terminal 10) based on processing that occurs at the fixed device.

Figure 2:
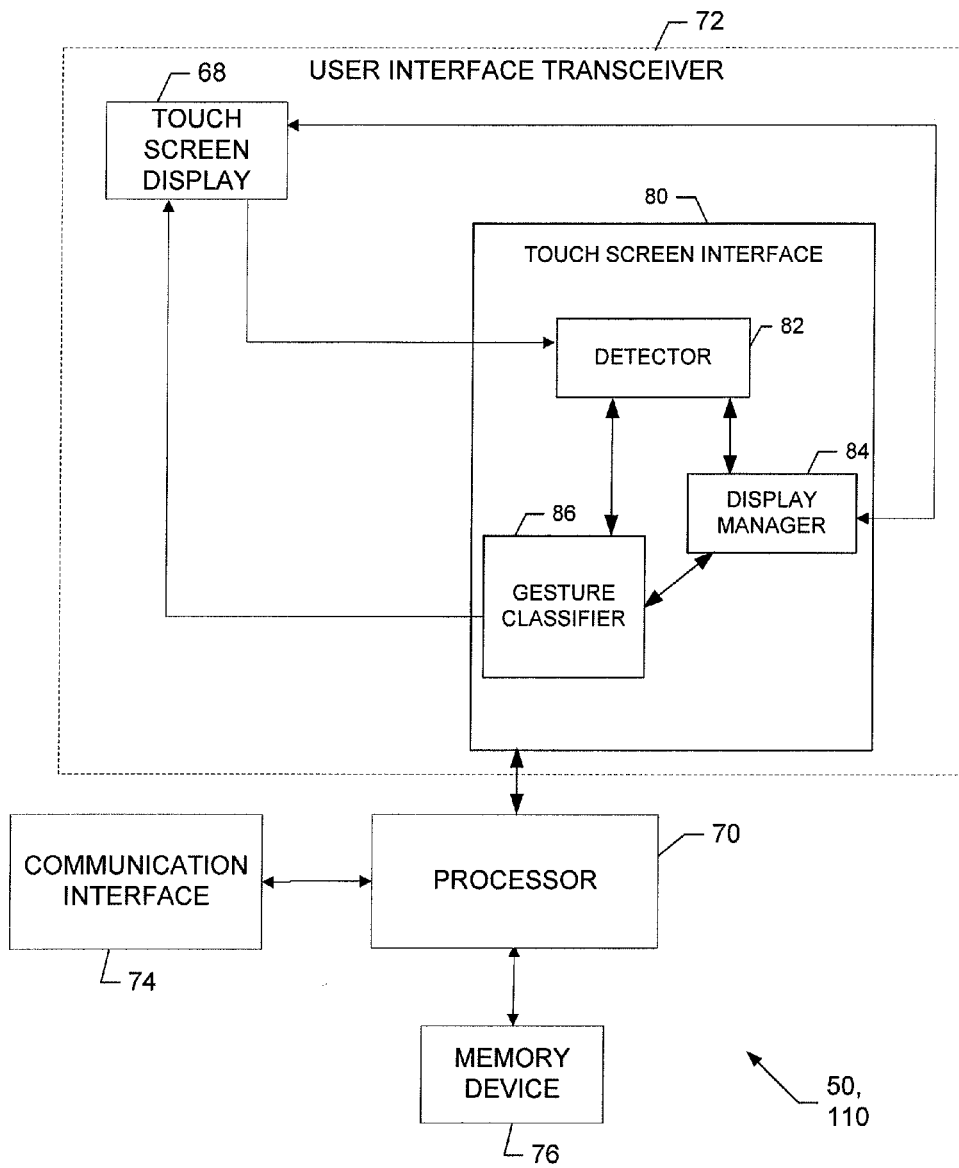
FIG. 2 illustrates a schematic block diagram of an apparatus for providing and/or detecting a dynamic fiducial marker according to an example embodiment of the present invention.

It should also be noted that while FIG. 2 illustrates one example of a configuration of an apparatus for providing and/or detecting dynamic fiducial markers, numerous other configurations may also be used to implement embodiments of the present invention. As such, in some embodiments, although devices or elements are shown as being in communication with each other, hereinafter such devices or elements should be considered to be capable of being embodied within a same device or element and, thus, devices or elements shown in communication should be understood to alternatively be portions of the same device or element.

Referring now to FIG. 2, the apparatus 50 for providing and/or detecting dynamic fiducial markers may include or otherwise be in communication with a processor 70, a user interface transceiver 72, a communication interface 74, and a memory device 76. In some embodiments, the processor 70 (and/or co-processors or any other processing circuitry assisting or otherwise associated with the processor 70) may be in communication with the memory device 76 via a bus for passing information among components of the apparatus 50. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device like the processor 70). The memory device 76 may be configured to store information, data, content, applications, instructions, or the like for enabling the apparatus to carry out various functions in accordance with an example embodiment of the present invention. For example, the memory device 76 could be configured to buffer input data for processing by the processor 70. Additionally or alternatively, the memory device 76 could be configured to store instructions for execution by the processor 70.

The apparatus 50 may, in some embodiments, be a mobile terminal (e.g., mobile terminal 10) or a fixed communication device or computing device configured to employ an example embodiment of the present invention. However, in some embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network. Additionally or alternatively, the communication interface 74 may include the circuitry for interacting with the antenna(s) to cause transmission of signals via the antenna(s) or to handle receipt of signals received via the antenna(s). In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface transceiver 72 may be in communication with the processor 70 to receive an indication of a user input and/or to cause provision of an audible, visual, mechanical or other output to the user. As such, the user interface transceiver 72 may include, for example, a keyboard, a mouse, a joystick, a display, a touch screen(s), touch areas, soft keys, a microphone, a speaker, or other input/output mechanisms. Alternatively or additionally, the processor 70 may comprise user interface circuitry configured to control at least some functions of one or more user interface elements such as, for example, a speaker, ringer, microphone, display, and/or the like. The processor 70 and/or user interface circuitry comprising the processor 70 may be configured to control one or more functions of one or more user interface elements through computer program instructions (e.g., software and/or firmware) stored on a memory accessible to the processor 70 (e.g., memory device 76, and/or the like).

In an example embodiment, the apparatus 50 may include or otherwise be in communication with a touch screen display 68 (e.g., the display 28). In different example cases, the touch screen display 68 may be a two dimensional (2D) or three dimensional (3D) display. The touch screen display 68 may be embodied as any known touch screen display. Thus, for example, the touch screen display 68 could be configured to enable touch recognition by any suitable technique, such as resistive, capacitive, infrared, strain gauge, surface wave, optical imaging, dispersive signal technology, acoustic pulse recognition, and/or other techniques. The user interface transceiver 72 may be in communication with the touch screen display 68 to receive touch inputs at the touch screen display 68 and to analyze and/or modify a response to such indications based on corresponding user actions that may be inferred or otherwise determined responsive to the touch inputs.

With continued reference to FIG. 2, in an example embodiment, the apparatus 50 may include a touch screen interface 80. The touch screen interface 80 may, in some instances, be a portion of the user interface transceiver 72. However, in some alternative embodiments, the touch screen interface 80 may be embodied as the processor 70 or may be a separate entity controlled by the processor 70. As such, in some embodiments, the processor 70 may be said to cause, direct or control the execution or occurrence of the various functions attributed to the touch screen interface 80 (and any components of the touch screen interface 80) as described herein. The touch screen interface 80 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the touch screen interface 80 as described herein. Thus, in examples in which software is employed, a device or circuitry (e.g., the processor 70 in one example) executing the software forms the structure associated with such means.

The touch screen interface 80 may be configured to receive an input in the form of a touch event at the touch screen display 68. As such, the touch screen interface 80 may be in communication with the touch screen display 68 to receive user inputs at the touch screen display 68 and to modify a response to such inputs based on corresponding user actions that may be inferred or otherwise determined responsive to the inputs. Following recognition of a touch event, the touch screen interface 80 may be configured to determine a classification of the touch event and provide a corresponding function based on the touch event in some situations.

In some embodiments, the touch screen interface 80 may include a detector 82, a display manager 84, and a gesture classifier 86. Each of the detector 82, the display manager 84, and the gesture classifier 86 may be any device or means embodied in either hardware or a combination of hardware and software configured to perform the corresponding functions associated with the detector 82, the display manager 84, and the gesture classifier 86, respectively, as described herein. In an exemplary embodiment, each of the detector 82, the display manager 84, and the gesture classifier 86 may be controlled by or otherwise embodied as the processor 70.

The detector 82 may be in communication with the touch screen display 68 to receive user inputs in order to recognize and/or determine a touch event based on each input received at the detector 82. A touch event may be defined as a detection of an object, such as a stylus, finger, pen, pencil, cellular telephone, digital camera, or any other mobile device (including the mobile terminal 10 shown in FIG. 1) or object, coming into contact with a portion of the touch screen display in a manner sufficient to register as a touch. In this regard, for example, a touch event could be a detection of pressure on the screen of the touch screen display 68 above a particular pressure threshold over a given area. Subsequent to each touch event, the detector 82 may be further configured to pass along the data corresponding to the touch event (e.g., location of touch, length of touch, number of objects touching, touch pressure, touch area, speed of movement, direction of movement, length of delay, frequency of touch, etc.) to the gesture classifier 86 for gesture classification. As such, the detector 82 may include or be in communication with one or more force sensors configured to measure the amount of touch pressure (e.g., force over a given area) applied as a result of a touch event, as an example.

The gesture classifier 86 may be configured to recognize and/or determine a corresponding classification of a touch event. In other words, the gesture classifier 86 may be configured to perform gesture classification to classify the touch event as any of a number of possible gestures. Some examples of recognizable gestures may include a touch, multi-touch, placement, stroke, character, symbol, shape, swipe, pinch event (e.g., a pinch in or pinch out), and/or the like.

A touch may be defined as a touch event that impacts a single area (without or with minimal movement on the surface of the touch screen display 68) and then is removed. A multi-touch may be defined as multiple touch events sensed concurrently (or nearly concurrently). A placement event may be defined as a touch even that is not removed or is maintained for a certain period of time (e.g., the placement of a cellular telephone on the tangible user interface display). A stroke event may be defined as a touch event followed immediately by motion of the object initiating the touch event while the object remains in contact with the touch screen display 68. In other words, the stroke event may be defined by motion following a touch event thereby forming a continuous, moving touch event defining a moving series of instantaneous touch positions (e.g., as a drag operation or as a flick operation). Multiple strokes and/or touches may be used to define a particular shape or sequence of shapes to define a character. A pinch event may be classified as either a pinch out or a pinch in (hereinafter referred to simply as a pinch). A pinch may be defined as a multi-touch, where the touch events causing the multi-touch are spaced apart. After initial occurrence of the multi-touch event involving at least two objects, one or more of the objects may move substantially toward each other to simulate a pinch. Meanwhile, a pinch out may be defined as a multi-touch, where the touch events causing the multi-touch are relatively close together, followed by movement of the objects initiating the multi-touch substantially away from each other. In some cases, the objects on a pinch out may be so close together initially that they may be interpreted as a single touch, rather than a multi-touch, which then is modified by movement of two objects away from each other.

The gesture classifier 86 may also be configured to communicate detection information regarding the recognition, detection, and/or classification of a touch event to the display manager 84. The display manager 84 may be configured to provide control over modifications made to that which is displayed on the touch screen display 68 based on the detection information received from the detector 82 and gesture classifications provided by the gesture classifier 86 in accordance with the responses prescribed for each respective gesture classification and implementation characteristic determined by the gesture classifier 86. In other words, the display manager 84 may configure the display (e.g., with respect to the content displayed and/or the user interface effects presented relative to the content displayed) according to the gesture classification and implementation characteristic classification determined for a given touch event that may be detected at the display.

Figure 3B:
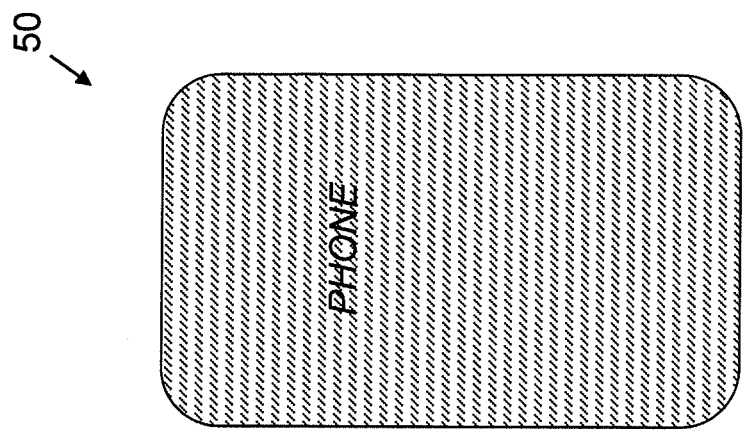
FIG. 3B illustrates a back-side view of the apparatus of FIG. 3A according to an example embodiment of the present invention.
Figure 3A:
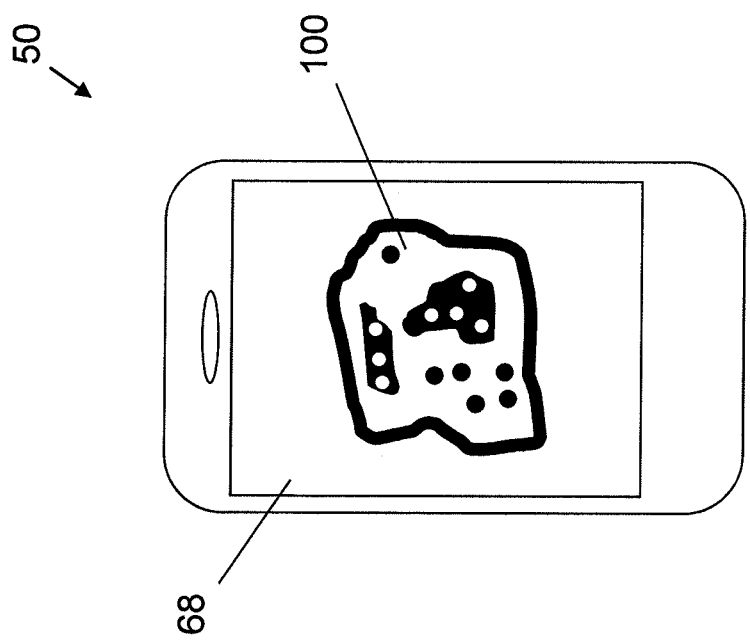
FIG. 3A illustrates a display-side view of an apparatus for providing and/or detecting a dynamic fiducial marker according to an example embodiment of the present invention.

Turning now to FIGS. 3A and 3B, in general, an apparatus 50, such as an apparatus embodied by the mobile terminal 10 of FIG. 1 (e.g., a cellular phone as depicted in the display-side view of FIG. 3A and the back-side view of FIG. 3B), is provided that has or is otherwise associated with a touch screen display 68. As described above, the apparatus 50 may comprise at least one processor (e.g., processor 70 of FIG. 2) and at least one memory (e.g., memory device 76 of FIG. 2) including computer program code. The at least one memory and the computer program code may be configured to, with the processor, cause the apparatus 50 to at least provide for presentation of a fiducial marker 100 on a display 68 of the apparatus.

The fiducial marker 100 may be representative of at least one property of the apparatus 50. In other words, a device that detects the fiducial marker 100 presented on the display 68 of the apparatus 50 embodied by the phone in this example may be able to derive certain information about the apparatus 50 based on the fiducial marker 100. For example, based on the patterned encodings on the fiducial marker 100 and the relative location of certain features of the pattern, the device "seeing" the fiducial marker may obtain certain information about the apparatus 50. Such information may include, for example, the position of the apparatus 50, the orientation of the apparatus 50 (e.g., with respect to the display of the device seeing the fiducial marker), the identity of the apparatus 50 (e.g., that the apparatus is a cellular telephone having certain functionality), connectivity information, and other information about the apparatus 50 that may facilitate communication and interaction with the apparatus 50. Connectivity information may include, for example, meta-information regarding a preferred communication medium and how to connect to the apparatus using the preferred communication medium (e.g., the IP address of the mobile telephone and/or a preferred communications protocol, such as the preference of the mobile telephone to communicate over a Bluetooth connection). In addition, other optional meta-information may be derived from the fiducial marker.

The memory and computer program code of the apparatus 50 may further be configured to, with the processor, cause the apparatus to modify the presentation of the fiducial marker 100 on the display 68 of the apparatus 50. The presentation of the fiducial marker 100 (e.g., the size, shape, and/or pattern of the fiducial marker) may be modified, for example, in response to a change in at least one of the properties represented by the fiducial marker. Thus, if the fiducial marker 100 is representative of the position, orientation, identity, and connectivity preferences of the apparatus, and, for example, the connectivity preferences of the apparatus change (e.g., the IP address of the apparatus changes), the fiducial marker 100 may be modified, and the new fiducial marker may reflect this change. In other words, in this example, by detecting and decoding a new/modified fiducial marker 100 that is provided on the display 68 of the apparatus, as described below, the device reading the fiducial marker may obtain new information about the apparatus (e.g., the new IP address) without necessitating user interaction (e.g., the user's manual intervention to affix a new fiducial marker 100 to the apparatus) or reference to a third-party look-up service or other forms of out-of-band communication.

In some embodiments, the fiducial marker 100 may include steganographic information. In other words, the information represented by the fiducial marker 100 may be encoded. For example, the fiducial marker 100 may include encrypted authentication credentials that, when decrypted by the device reading the fiducial marker, may facilitate communication between the apparatus embodied by the cellular phone (in this example) and the device. Fiducial markers may also be modified to satisfy security, privacy, or system policy requirements which may vary depending upon user state, environment, and system properties. Additionally, actions to be taken by the device may be qualified and/or filtered by such security, privacy, or system policy requirements.

Figure 4:
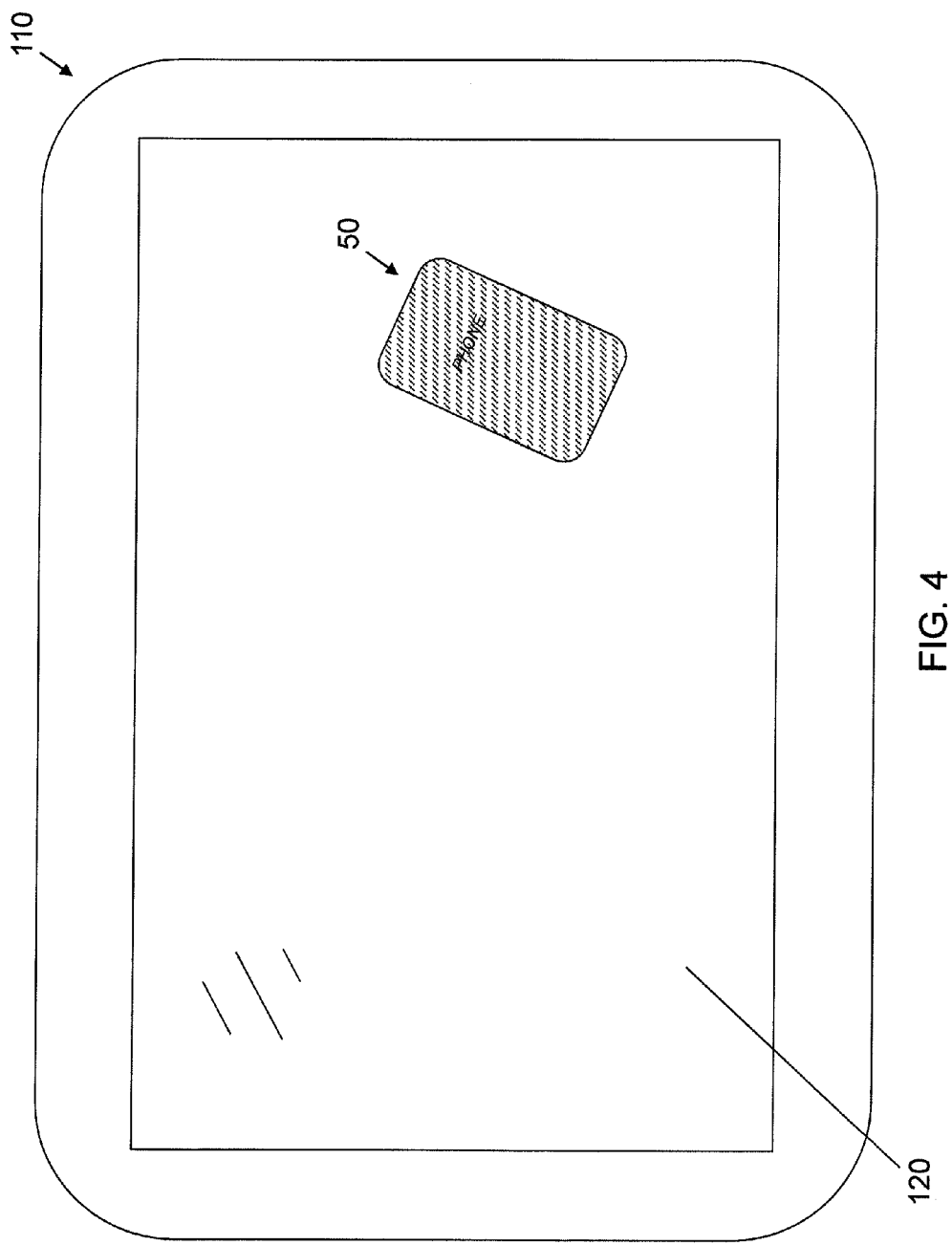
FIG. 4 shows the apparatus of FIGS. 3A and 3B disposed display-side-down on a device including a tangible user interface display according to an example embodiment of the present invention.

With reference to FIG. 4, for example, the apparatus 50 embodied by the cellular phone in the previous example may be placed display-side-down on a device 110, such as a tablet computer with a touch screen display 120. The device 110 may be configured to read a fiducial marker (e.g., the fiducial marker 100 shown in FIG. 3A) presented on the display of the apparatus 50 embodied by the cellular phone. The device 110 may be or embody an apparatus 50, and in some cases the apparatus 50 and the device 110 may have identical configurations; however, for ease of explanation, the designation of the apparatus 50 is used in the figures as the device configured for providing the dynamic fiducial marker, whereas the designation of the device 110 is used in the figure to refer to the device configured for detecting the dynamic fiducial marker.

In this regard, the device 110 may include or embody an apparatus comprising at least one processor (e.g., processor 70 of FIG. 2) and at least one memory (e.g., memory device 76 of FIG. 2) including computer program code. The at least one memory and the computer program code may be configured to, with the processor, cause the apparatus to at least receive an indication of a first fiducial marker presented on a display of a device proximate the apparatus. In other words, the apparatus embodied by the device 110 may be configured to receive an indication of the fiducial marker 100 shown in FIG. 3A that is presented on the display 68 of the cellular phone 50 in this example. The device 110 may execute a first operation based on the first fiducial marker. For example, the device 110 (e.g., the tablet computer) may establish a connection with the mobile phone 50 via an IP address represented by the fiducial marker 100.

Figure 5:
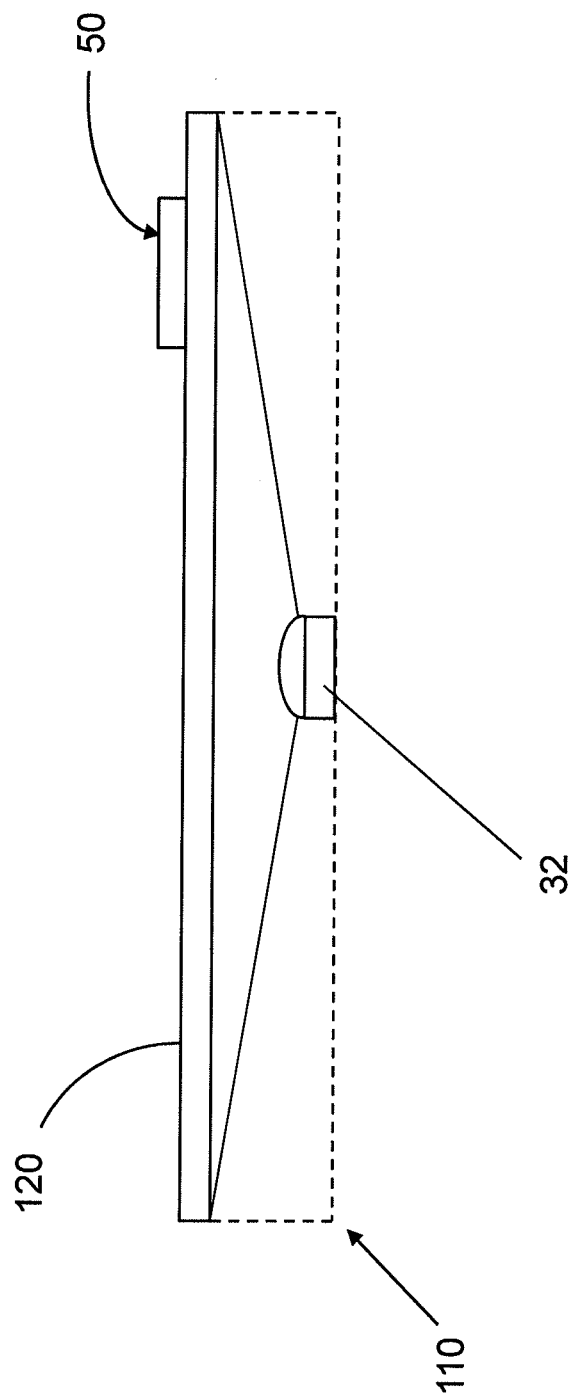
FIG. 5 illustrates a side view of FIG. 4 in which a portion of the device including a tangible user interface display is removed to show a camera according to an example embodiment of the present invention.

The apparatus embodied by the device 110 (e.g., the tablet computer) may then receive an indication of a second fiducial marker presented on the display 68 of the device embodying the apparatus 50 (e.g., the cellular phone). For example, the second fiducial marker may be a different fiducial marker or a modified version of the first fiducial marker that is presented as a result of a change in one of the properties of the cellular phone represented by the fiducial marker, such as a change in the IP address, as described above. Accordingly, a second operation may be executed by the device 110 (e.g., the tablet computer) based on the second fiducial marker. For example, the tablet computer may use the new IP address to exchange data with the cellular phone in the previous example. FIG. 5 illustrates a side view of the relationship between the apparatus embodied by the device 110 (e.g., the tablet computer) and the apparatus 50 embodied by the cellular telephone, with portions of the tablet computer removed to show a camera 32 configured to capture an image of the fiducial marker presented on the display of the cellular telephone.

In the example described above, the apparatus 50 embodied by the cellular telephone may be considered the tangible object, and the apparatus embodied by the device 110 (e.g., the tablet computer) may be considered as providing the tangible user interface. In some cases, however, both devices (e.g., the cellular telephone and the tablet computer) may be equipped with the functionality to serve as both the tangible object and the tangible user interface display. Thus, turning to FIG. 3A, in some embodiments, the apparatus 50 embodied by the cellular telephone in the previous examples may include memory and computer program code that are configured to, with the processor, cause the apparatus 50 to receive an indication of a fiducial marker presented on a display of a device (e.g., the display 120 of the device 110) proximate the apparatus 50.

Figure 6:
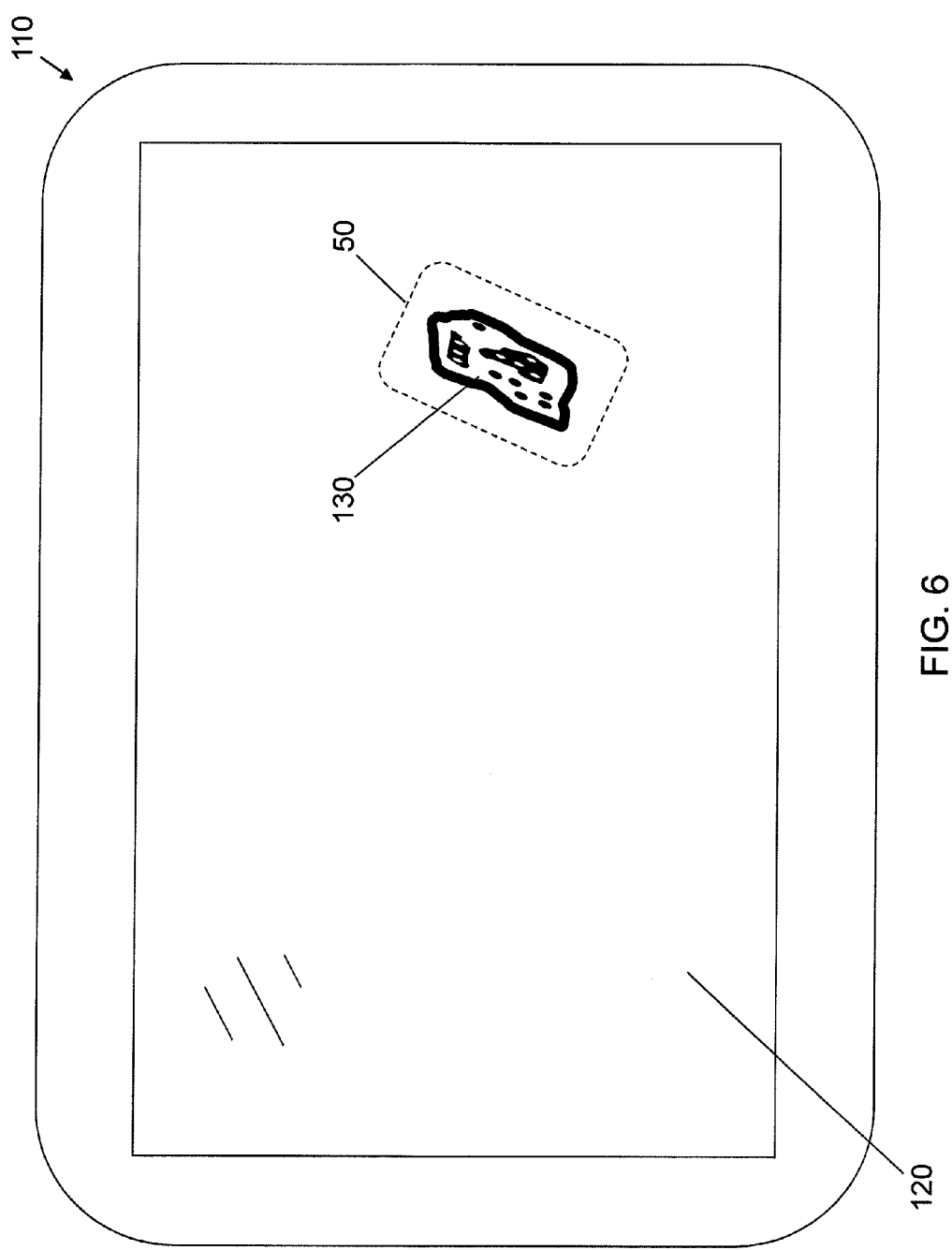
FIG. 6 shows a display-side view of the device of FIG. 4 with the apparatus embodied by the cellular telephone shown in dashed lines according to an example embodiment of the present invention.

In this regard, as shown in FIG. 6 (in which the apparatus 50 embodied by the cellular telephone is shown in dashed lines for purposes of explanation), the memory and computer program code of the apparatus embodied by the device 110 (e.g., the tablet computer) may be configured to, with the processor, cause the apparatus embodied by the device 110 to provide for presentation of a fiducial marker 130 on the display 120 of the apparatus. As noted above with respect to the cellular phone example, the fiducial marker 130 presented on the display 120 of the tablet computer 110 may also be representative of at least one property of the apparatus (the tablet computer) and may be detectable by the nearby device (in this case, the cellular telephone embodying the apparatus 50). In other words, in this example, and with reference to FIG. 6, the tablet computer 110 may be configured to present a fiducial marker 130 on its display 120 that can, in turn, be read by the cellular telephone 50. Embodiments in which both devices can present dynamic fiducial markers on their respective displays and read fiducial markers thus allow bi-directional communication to be achieved. In other words, each device may be able to obtain information about the other device to enable communication between the two devices, with any relevant changes to the properties of the respective devices also being communicated through modification of the respective fiducial markers on the respective displays.

With continued reference to FIG. 6, the presentation of the fiducial marker 130 on the display 120 of the apparatus embodied by the device 110 (e.g., the tablet computer) may, in some cases, be provided in response to the receipt of the indication of the first fiducial marker or the indication of the second fiducial marker presented on the display 68 of the device (e.g., the cellular phone 50). In other words, the fiducial marker 100 presented on the cellular phone 50 in the example described above may represent information indicating that the cellular phone is configured for bi-directional communication (e.g., can read fiducial markers). Upon reading the fiducial marker 100 of the cellular phone 50 and determining that the phone is able to read fiducial markers, the tablet computer 110 may provide for the presentation of its own fiducial marker 130 for detection by the phone. Bi-directional communication may thus be established.

Similarly, the memory and computer program code of the apparatus 50 embodied by the cellular phone in this example may be configured to, with the processor cause the apparatus 50 to modify the presentation of the fiducial marker 100 based on the indication of the fiducial marker 130 that the apparatus 50 receives from the apparatus embodied by the device 110 (e.g., the tablet computer). In other words, continuing the example above, the fiducial marker 130 of the tablet computer may represent that the tablet computer has a preference for communicating over WiFi rather than Bluetooth. Based on this information, the cellular phone 50 may modify its own fiducial marker 100 to indicate that the phone also prefers to communicate over WiFi (as opposed to, for example, a previous representation of a preference for Bluetooth).

As noted above, either device (the device 110 or the apparatus 50) may be configured to present fiducial markers 130, 100 that include steganographic information, such as, e.g., encrypted authentication credentials that may be used to enable communication between the two devices or allow access to specific (e.g., protected) content on one or both devices. In this regard, the memory and computer program code of one or both devices may be configured to, with the processor, cause the respective apparatus to decode the indication of at least one of the first fiducial marker (e.g., the originally presented fiducial marker) or the second fiducial marker (e.g., the modified fiducial marker) that is presented on the display of the other device.

In some embodiments, the display of the apparatus presenting the fiducial marker (e.g., the display 68 of the apparatus 50 embodied by the phone in the example above or the display 120 of the device 110 embodied by the tablet computer in the example above) may be a polarized display. In this way, different fiducials may be presented on the respective display 68, 120 based on the viewing angle of the camera 32 of the device reading the fiducial marker. This may be useful, for example, if the apparatus presenting the fiducial marker (e.g., the cellular phone) wishes to indicate to the device reading the fiducial marker (e.g., the tablet computer) that the specific content, information, user interface elements, or application need to be displayed on a specific portion of the display of the device reading the fiducial marker (e.g., the tablet computer) relative to the position of the apparatus presenting the fiducial marker (e.g., the cellular phone), such as when photos are to be presented on one side of the display and videos are to be presented on the other side of the display.

Figure 7:
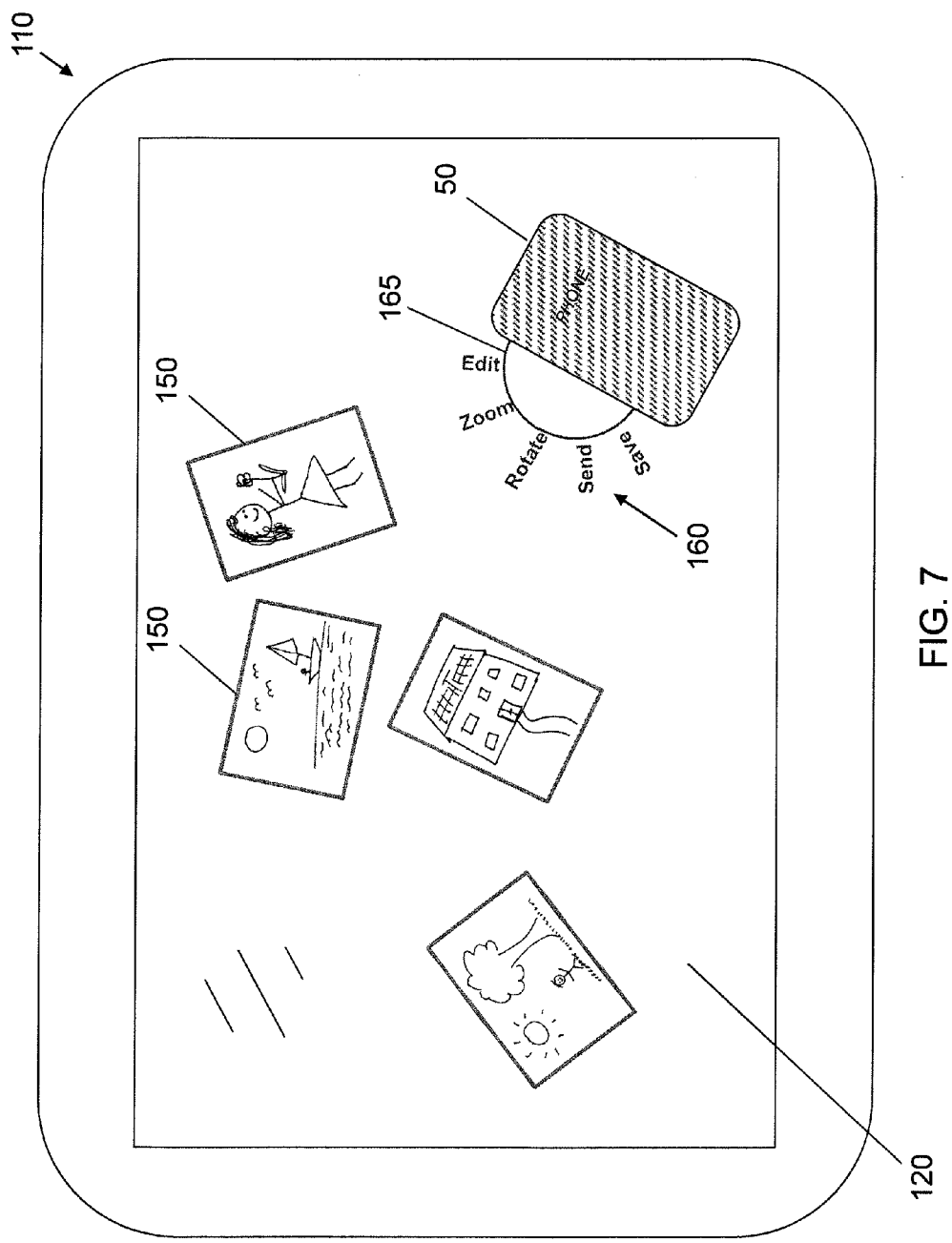
FIG. 7 illustrates an example of interaction between an apparatus and a device in a uni-directional communication scenario.

FIG. 7 provides an example of operations that may be executed and interactions that may occur between the apparatus 50 and the device 110 in a uni-direction communication scenario. In this example, the apparatus 50 is a cellular telephone that has digital pictures stored in a memory of the phone and acts as the tangible object, and the device 110 is a tablet computer that is configured to provide a tangible user interface. When the phone 50 is placed display-side down on the display 120 in this example, the tablet computer 110 detects and reads (e.g., using a camera 32 shown in FIG. 5) the fiducial marker 100 provided on the display 68 of the phone 50 (shown in FIG. 3A).

In the depicted example of FIG. 7, the phone 50 causes several pictures 150 that are stored on the phone 50 to be displayed on the display 120 for the user to view. The tablet computer 110 may obtain the content to display by establishing a wireless connection with the phone 50, e.g., using a Bluetooth address of the device that is represented in the fiducial marker 100 presented on the device display. The user may be able to move the pictures 150 around the display 120, for example to spread them out or to place them in a certain order for easier viewing, by directly interacting with the display 120 (e.g., using a finger or stylus to provide touch inputs to the display). Moreover, a list of user options may be displayed on the display 68 that relate to the data being viewed and/or manipulated. Continuing the above example, the user may be presented with an options wheel 160 with options to "edit," "zoom," "rotate," "send," or "save" one or more of the displayed images. One or more of the displayed options may be selected by the user through direct contact with the display 120 in the form of a touch input applied to the display.

If for some reason the Bluetooth connection becomes unavailable, the phone 50 may need to specify a new preference to communicate over a WiFi connection. The phone 50 may thus modify the presentation of the fiducial marker 100, and the new, modified version of the fiducial marker may represent to the tablet computer the new preference to communicate over WiFi, as well as any other information needed to establish or renew the communications connection.

Figure 8:
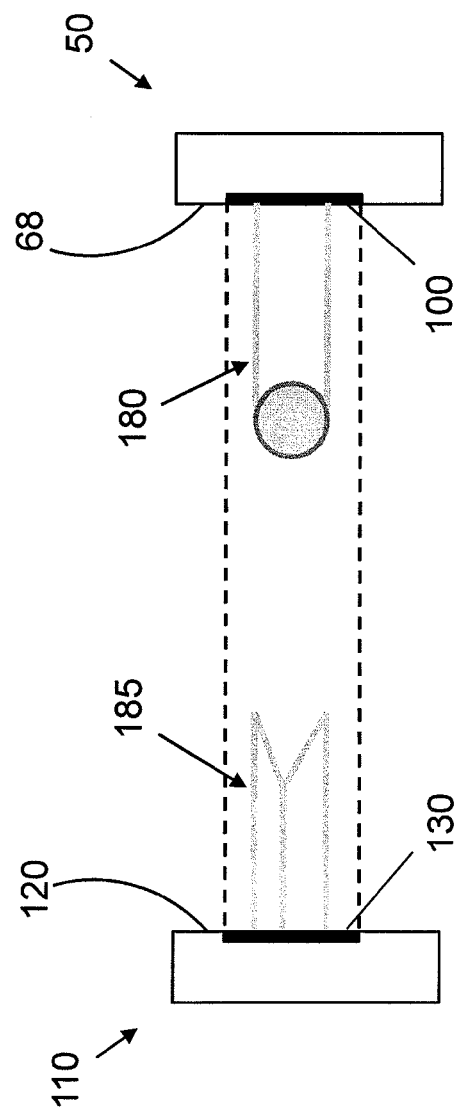
FIG. 8 illustrates an example of interaction between an apparatus and a device in a bi-directional communication scenario.

Another example is depicted in FIG. 8, in which two cellular phones 50, 110 are provided, and each device acts as both a tangible object and a provider of a tangible user interface in a bi-directional communication scenario. Thus, in this example, each cellular phone 50, 110 presents a fiducial marker 100, 130 on a respective display 68, 120 and reads the fiducial marker presented on the display of the other phone. The devices in this example need not be touching each other to allow detection of the fiducial markers, but, as shown, may be spaced apart. Based on the information derived from the fiducial markers, each device may execute certain operations. For example, a wireless connection may be established between the two devices, and files or other data may be exchanged between the devices. In a virtual reality gaming application, three-dimensional images 180, 185 may be projected from the display of each respective device based on the fiducial markers, representing a challenge to be met by one or the other player or a user's identity or status in the game being played by the two users. Again, any change in the properties represented by the respective fiducial markers may be reflected in a modification of the corresponding fiducial marker for detection by the other device so that any necessary operations may be executed to accommodate the change.

FIGS. 7 and 8 illustrate only two examples of embodiments of the invention described above. Various other functions, applications, and devices may also benefit from embodiments of the invention described above, with the simple depicted embodiments being selected only for the purpose of explanation.

Figure 9:
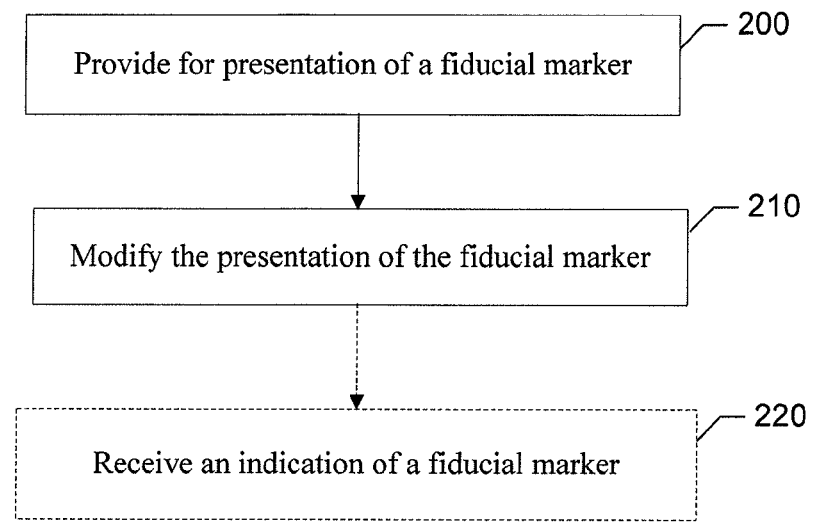
FIG. 9 illustrates a flowchart of methods of providing a dynamic fiducial marker in accordance with another example embodiment of the present invention.
Figure 10:
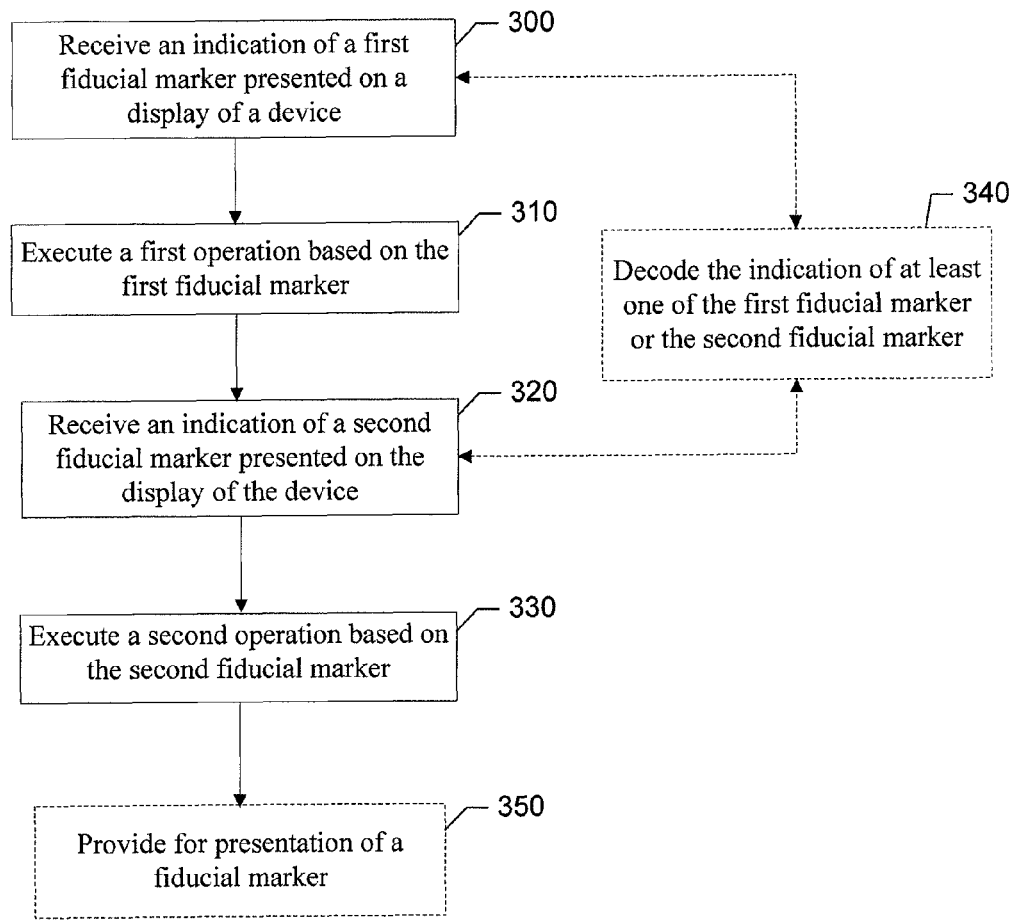
FIG. 10 illustrates a flowchart of methods of detecting a dynamic fiducial marker in accordance with another example embodiment of the present invention.

FIGS. 9 and 10 illustrate flowcharts of systems, methods, and computer program products according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus implements the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowcharts support combinations of means for performing the specified functions, combinations of operations for performing the specified functions, and program instruction means for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In this regard, one embodiment of a method for providing dynamic fiducial markers, as shown in FIG. 9, includes providing for presentation of a fiducial marker on a display of an apparatus at Block 200, wherein the fiducial marker is representative of at least one property of the apparatus, as described above. The method further includes modifying the presentation of the fiducial marker at Block 210 in response to a change in the at least one property of the apparatus. Thus, as described above, a change in the connectivity information associated with the apparatus may result in a modification of the fiducial marker to reflect the new connectivity information for facilitating communication between the apparatus and another device.

In some cases, an indication of a fiducial marker presented on a display of a device proximate the apparatus may be received at Block 220. In other words, the apparatus may be configured for bi-directional communication, such that the apparatus is able to read fiducial markers provided on other device displays, in addition to presenting its own fiducial marker.

As noted above, in some embodiments, the fiducial marker may include steganographic information, such as encrypted authorization credentials for authorizing communication between the apparatus and the device and/or for allowing access to certain information that may not be available to all users. Furthermore, in still other embodiments, the display of the apparatus may be a polarized display, such that the presentation of the fiducial marker on the display may be dependent on an angle of the display of the apparatus with respect to a display of the other device proximate the apparatus.

FIG. 10 illustrates an embodiment of a method for receiving (e.g., "reading") dynamic fiducial markers that includes receiving an indication of a first fiducial marker presented on a display of a device at Block 300 and executing a first operation based on the first fiducial marker at Block 310. An indication of a second fiducial marker may be presented on the display of the device at Block 320, and a second operation may be executed based on the second fiducial marker at Block 330. The second fiducial marker may be different from the first fiducial marker and may thus replace the first fiducial marker. The second fiducial marker may thus be a modified version of the first fiducial marker or a new fiducial marker that takes the place of the first fiducial marker.

In some cases, as described above, the fiducial markers may include stenographic information. Accordingly, the indication of the first fiducial marker, the second fiducial marker, or both may be decoded at Block 340 to derive information for facilitating communication between the devices.

Furthermore, the method may provide for presentation of a fiducial marker on a display of an apparatus at Block 350, such that the apparatus is not only reading fiducial markers, but presenting its own fiducial markers. In this regard, and as noted above, the fiducial marker may be representative of at least one property of the apparatus and may be detectable by the device with which the apparatus is establishing a communications connection.

In some embodiments, certain ones of the operations above may be modified or further amplified as described below. Furthermore, in some embodiments, additional optional operations may be included, some examples of which are shown in dashed lines in FIGS. 9 and 10. Modifications, additions, or amplifications to the operations above may be performed in any order and in any combination.

In an example embodiment, an apparatus for performing the method of FIGS. 9 and 10 above may comprise a processor (e.g., the processor 70 of FIG. 2) configured to perform some or each of the operations (200-350) described above. The processor may, for example, be configured to perform the operations (200-350) by performing hardware implemented logical functions, executing stored instructions, or executing algorithms for performing each of the operations. Alternatively, the apparatus may comprise means for performing each of the operations described above. In this regard, according to an example embodiment, examples of means for performing at least portions of operations 200 and 210 of FIG. 9 may comprise, for example, the user interface transceiver 72, the communication interface 74, the processor 70, and/or a device or circuit for executing instructions or executing an algorithm for processing information as described above. Examples of means for performing operation 220 may comprise, for example, the user interface transceiver 72, the communication interface 74, the processor 70, the memory device 76, and/or a device or circuit for executing instructions or executing an algorithm for processing information as described above. Examples of means for performing operation 350 of FIG. 10 may comprise, for example, the user interface transceiver 72, the communication interface 74, the processor 70, and/or a device or circuit for executing instructions or executing an algorithm for processing information as described above. Moreover, examples of means for performing at least portions of operations 300 and 320 may comprise, for example, the communication interface 74, the processor 70, and/or a device or circuit for executing instructions or executing an algorithm for processing information as described above. Examples of means for performing at least portions of operations 310, 330, and 340 may comprise, for example, the processor 70 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising at least one processor and at least one memory including computer program code, the at least one memory and the computer program code configured to, with the processor, cause the apparatus to at least:
   receive an indication of a first fiducial marker comprising a first patterned encoding of information, wherein the first fiducial marker is generated by a device proximate the apparatus and wherein the device comprises a display upon which an image of the first fiducial marker is projected;
   execute a first operation comprising establishing a connection between the apparatus and the device based on the first fiducial marker;
   provide for receipt of content from the device via the connection and present the content on a display associated with the apparatus;
   provide for presentation of a user interface element on the display associated with the apparatus, wherein the user interface element includes at least one option selectable by a user for executing an operation with respect to the content presented;
   receive an indication of a second fiducial marker comprising a second patterned encoding of information, wherein the second fiducial marker is generated by the device in response to a change in at least one property represented by the first fiducial marker and wherein an image of the second fiducial marker is projected upon the display of the device, wherein the second fiducial marker is different from the first fiducial marker and replaces the first fiducial marker; and
   execute a second operation comprising modifying an aspect of the connection between the apparatus and the device to maintain presentation of the content based on the second fiducial marker,
   wherein projection of the first fiducial marker followed by the second fiducial marker creates an effect of having a dynamic fiducial marker.

2. The apparatus of claim 1, wherein the memory and computer program code are configured to, with the processor, cause the apparatus to provide for presentation of a fiducial marker on a display of the apparatus, wherein the fiducial marker is representative of at least one property of the apparatus and is detectable by the device.

3. The apparatus of claim 2, wherein the presentation of the fiducial marker on the display of the apparatus is provided in response to the receipt of the indication of the first fiducial marker or the indication of the second fiducial marker projected on the display of the device.

4. The apparatus of claim 1, wherein the memory and computer program code are configured to, with the processor, cause the apparatus to decode the indication of at least one of the first fiducial marker or the second fiducial marker.

5. A method comprising:
   receiving an indication of a first fiducial marker comprising a first patterned encoding of information, wherein the first fiducial marker is generated by a device comprising a display upon which an image of the first fiducial marker is projected;
   executing a first operation, via a processor, comprising establishing a connection between the apparatus and the device based on the first fiducial marker;
   providing for receipt of content from the device via the connection and presenting the content on a display associated with the apparatus;
   providing for presentation of a user interface element on the display associated with the apparatus, wherein the user interface element includes at least one option selectable by a user for executing an operation with respect to the content presented;
   receiving an indication of a second fiducial marker comprising a second patterned encoding of information, wherein the second fiducial marker is generated by the device in response to a change in at least one property represented by the first fiducial marker and wherein an image of the second fiducial marker is projected upon the display of the device, wherein the second fiducial marker is different from the first fiducial marker and replaces the first fiducial marker; and
   executing a second operation, via the processor, comprising modifying an aspect of the connection between the apparatus and the device to maintain presentation of the content based on the second fiducial marker,
   wherein projection of the first fiducial marker followed by the second fiducial marker creates an effect of having a dynamic fiducial marker.

6. The method of claim 5 further comprising providing for presentation of a fiducial marker on a display of an apparatus proximate the device, wherein the apparatus includes the processor, wherein the fiducial marker is representative of at least one property of the apparatus and is detectable by the device.

7. The method of claim 5 further comprising decoding the indication of at least one of the first fiducial marker or the second fiducial marker.

8. A computer program product comprising at least one non-transitory computer-readable storage medium having computer-executable program code portions stored therein, the computer-executable program code portions comprising program code instructions for:
   executing a first operation comprising establishing a connection between the apparatus and the device based on the first fiducial marker;
   providing for receipt of content from the device via the connection and presenting the content on a display associated with the apparatus;
   providing for presentation of a user interface element on the display associated with the apparatus, wherein the user interface element includes at least one option selectable by a user for executing an operation with respect to the content presented;
   receiving an indication of a second fiducial marker comprising a second patterned encoding of information, wherein the second fiducial marker is generated by the device in response to a change in at least one property represented by the first fiducial marker and wherein an image of the second fiducial marker is projected upon the display of the device, wherein the second fiducial marker is different from the first fiducial marker and replaces the first fiducial marker; and
   executing a second operation comprising modifying an aspect of the connection between the apparatus and the device to maintain presentation of the content based on the second fiducial marker,
   wherein projection of the first fiducial marker followed by the second fiducial marker creates an effect of having a dynamic fiducial marker.

9. The computer program product of claim 8 further comprising program code instructions for providing for presentation of a fiducial marker on a display of an apparatus proximate the device, wherein the fiducial marker is representative of at least one property of the apparatus and is detectable by the device.

10. The computer program product of claim 8 further comprising program code instructions for decoding the indication of at least one of the first fiducial marker or the second fiducial marker.

\* \* \* \* \*